US012132803B2

United States Patent
Newton

(10) Patent No.: US 12,132,803 B2
(45) Date of Patent: *Oct. 29, 2024

(54) FRONT-END OPTIMIZATION IN A CONTENT DELIVERY NETWORK (CDN)

(71) Applicant: Level 3 Communications, LLC, Broomfield, CO (US)

(72) Inventor: Christopher Newton, Westlake Village, CA (US)

(73) Assignee: Sandpiper CDN, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,730

(22) Filed: Jul. 6, 2023

(65) Prior Publication Data
US 2023/0362273 A1    Nov. 9, 2023

Related U.S. Application Data

(63) Continuation of application No. 17/951,646, filed on Sep. 23, 2022, now Pat. No. 11,700,318, which is a
(Continued)

(51) Int. Cl.
*H04L 67/568*    (2022.01)
*H04L 67/01*    (2022.01)
(Continued)

(52) U.S. Cl.
CPC ............ *H04L 67/568* (2022.05); *H04L 67/01* (2022.05); *H04L 67/02* (2013.01); *H04L 67/1097* (2013.01); *H04L 69/04* (2013.01)

(58) Field of Classification Search
CPC ....... H04L 67/568; H04L 67/01; H04L 67/02; H04L 67/1097; H04L 69/04;
(Continued)

(56) References Cited

U.S. PATENT DOCUMENTS

| 7,343,398 B1 * | 3/2008 | Lownsbrough | H04L 63/166 |
| | | | 709/229 |
| 8,060,613 B2 * | 11/2011 | Farber | H04L 67/564 |
| | | | 709/226 |

(Continued)

FOREIGN PATENT DOCUMENTS

| WO | WO-2002052447 | 7/2002 |
| WO | WO-2011071850 | 6/2011 |

OTHER PUBLICATIONS

"Content Delivery Network", *WikiPedia* Jul. 8, 2016 2016, 9 pgs.
(Continued)

*Primary Examiner* — Muhammad Raza
(74) *Attorney, Agent, or Firm* — C. Tumey Law Group PLLC

(57) ABSTRACT

A computer-implemented method, operable on a device in a content delivery network (CDN), wherein the CDN delivers content on behalf of at least one content provider, the device implementing a content delivery (CD) service, the method includes, by the service on the device: receiving a request for a particular resource from a client; determining whether the client includes an optimization support mechanism; when the client includes an optimization support mechanism, providing the client with a first version of the particular resource, optimized, at least in part, for the capabilities of the client in combination with the optimization support mechanism; otherwise providing the client with either (i) an un-optimized version of the particular resource, or (ii) a version of the particular resource optimized, at least in part, for the capabilities of the client without the capabilities of the optimization support mechanism.

16 Claims, 5 Drawing Sheets

Related U.S. Application Data continuation of application No. 16/562,426, filed on Sep. 5, 2019, now Pat. No. 11,457,089, which is a continuation of application No. 15/241,044, filed on Aug. 18, 2016, now Pat. No. 10,412,186.

(51) Int. Cl.
*H04L 67/02* (2022.01)
*H04L 67/1097* (2022.01)
*H04L 69/04* (2022.01)

(58) Field of Classification Search
CPC .............. H04L 67/2823; H04L 67/42; H04L 67/2842; H04L 67/2828; H04L 67/2847; H04L 67/34; H04L 67/2804; H04L 67/2819; H04L 67/28; G06F 17/30893; G06F 12/0862; G06F 17/30902; G06F 3/0641

See application file for complete search history.

(56) References Cited

U.S. PATENT DOCUMENTS

| | | | | |
|---|---|---|---|---|
| 8,356,074 | B1* | 1/2013 | Ehrlich | H04L 67/1021 709/250 |
| 9,158,845 | B1* | 10/2015 | Reddy | G06F 16/951 |
| 9,407,727 | B1* | 8/2016 | McCanne | H04L 67/34 |
| 2004/0205249 | A1* | 10/2004 | Berry | H04L 69/22 709/247 |
| 2005/0188112 | A1* | 8/2005 | Desai | H04L 69/04 709/247 |
| 2009/0109854 | A1* | 4/2009 | Rajpathak | H04L 67/1023 370/238 |
| 2010/0223322 | A1* | 9/2010 | Mott | H04L 67/02 709/203 |
| 2011/0137973 | A1* | 6/2011 | Wei | H04L 67/1001 709/202 |
| 2012/0149382 | A1* | 6/2012 | Fox | H04W 36/245 455/445 |
| 2013/0159472 | A1* | 6/2013 | Newton | H04L 67/5682 709/219 |
| 2013/0166634 | A1 | 6/2013 | Holland | |
| 2013/0227078 | A1* | 8/2013 | Wei | H04L 67/02 709/224 |
| 2013/0262697 | A1* | 10/2013 | Karasaridis | H04L 67/568 709/242 |
| 2014/0092904 | A1* | 4/2014 | Martin | H04L 69/22 370/392 |
| 2014/0237201 | A1* | 8/2014 | Swift | H04L 69/04 711/162 |
| 2014/0280305 | A1* | 9/2014 | James | H04L 61/4511 707/769 |
| 2015/0089352 | A1* | 3/2015 | Conboy | G06F 16/9574 715/234 |
| 2015/0263932 | A1* | 9/2015 | Chunduri | H04L 45/12 370/389 |
| 2015/0264009 | A1* | 9/2015 | Scharber | H04L 67/1095 709/203 |
| 2015/0334094 | A1* | 11/2015 | Suresh | H04L 45/74 713/153 |
| 2017/0187768 | A1* | 6/2017 | Huang | H04L 67/1021 |
| 2018/0054497 | A1 | 2/2018 | Newton | |
| 2019/0394296 | A1 | 12/2019 | Newton | |
| 2023/0015966 | A1 | 1/2023 | Newton | |

OTHER PUBLICATIONS

"Data compression", *Wikipedia* Jun. 29, 2015 2016, 13 pgs.
European Examination Report, dated Jul. 23, 2021, Application No. 17841771.3, filed Jan. 11, 2017; 7 pgs.
Extended European Search Report, dated Dec. 16, 2019, Application No. 17841771.3, filed Jan. 11, 2017; 9 pgs.
"GIF", *Wikipedia* Jun. 16, 2016 2016, 21 pgs.
International Preliminary Report on Patentability, dated Feb. 19, 2019, Int'l. Appl. No. PCT/US17/012912, Int'l Filing Date Jan. 11, 2017; 9 pgs.
International Search Report dated Apr. 6, 2017, Int'l Appl. No. PCT/US17/012912, Int'l Filing Date Jan. 11, 2017; 3 pgs.
"JPEG", *Wikipedia* Jul. 25, 2016 2016, 30 pgs.
"Packeteer's AppCelera™ ICX: Internet Content Accelerator", Packeteer, Inc. 2001, 2 pgs.
Written Opinion of the International Searching Authority dated Apr. 6, 2017, Int'l Appl. No. PCT/US17/012912, Int'l Filing Date Jan. 11, 2017; 7 pgs.
Chu, Francis, "AppCelera: Smart Compression", QuinStreet Inc., Dec. 9, 2002, 3 pgs.

* cited by examiner

US 12,132,803 B2

FRONT-END OPTIMIZATION IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

Field of the Invention

This invention relates to content delivery and content delivery networks. More specifically, this invention relates to front-end optimization in content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CDN means content delivery network;
HTTP means Hyper Text Transfer Protocol;
HTML means Hypertext Markup Language;
HTTPS means HTTP Secure;
URI means Uniform Resource Identifier; and
URL means Uniform Resource Locator.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

BACKGROUND AND OVERVIEW

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
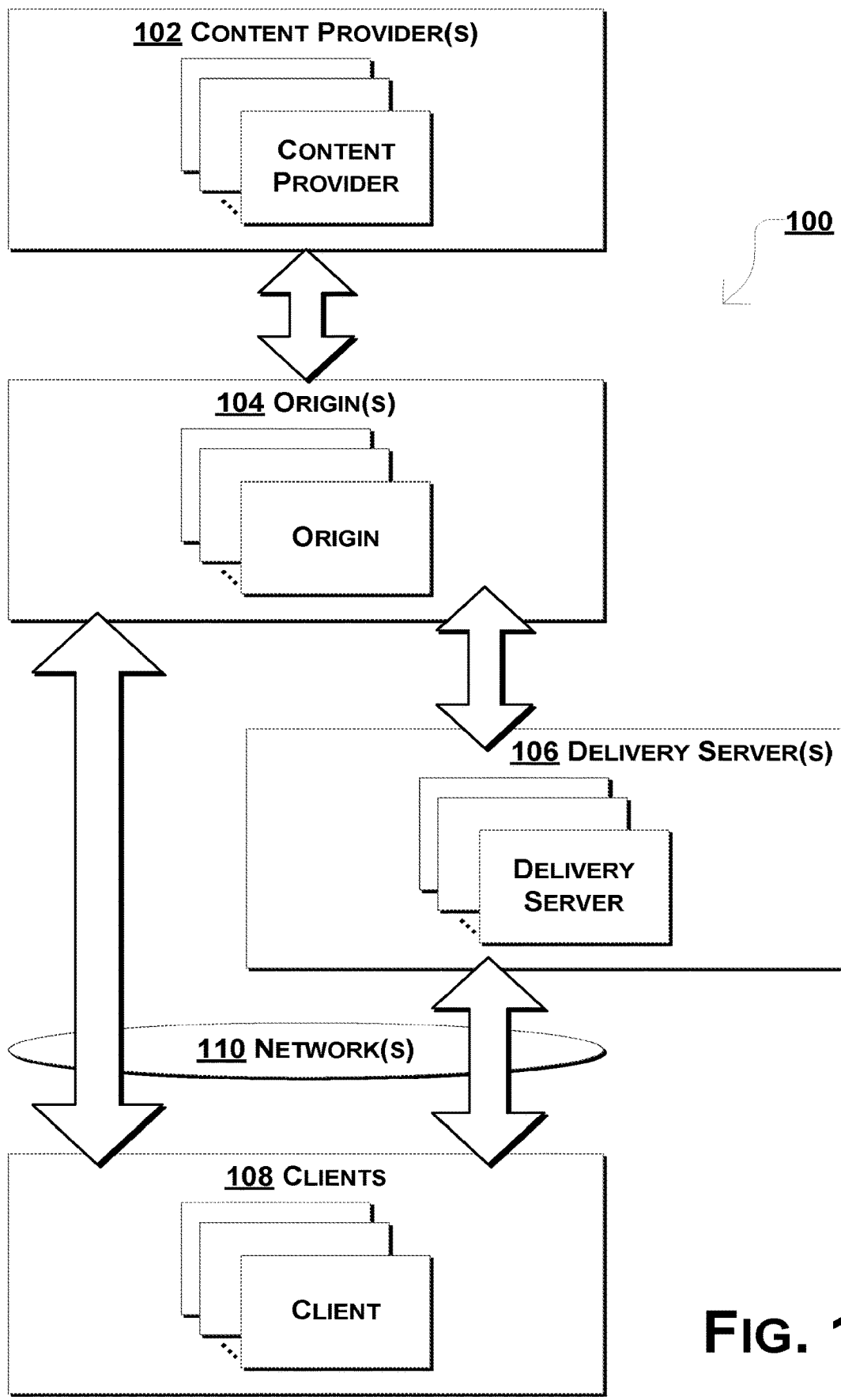
FIG. 1 depicts aspects of a content delivery network (CDN) according to exemplary embodiments hereof.

FIG. 1 shows aspects of an exemplary CDN 100 in which one or more content providers 102 provide content via one or more origin sources 104 and delivery services (servers) 106 to clients 108 via one or more networks 110. The delivery services (servers) 106 may form a delivery network from which clients may obtain content. The delivery services 106 may be logically and/or physically organized hierarchically and may include edge caches.

Exemplary CDNs are described in U.S. Pat. Nos. 8,060,613 and 8,825,830, the entire contents of both of which have been fully incorporated herein by reference for all purposes.

Content associated with or provided by a particular content provider may be referred to as a property. A property may be, e.g., a website and related content, and typically comprises multiple resources. A CDN may provide one or more properties associated with and/or on behalf of one or more content providers. A content provider may have more than one property, and thus a CDN may serve/provide one or more properties associated with and/or on behalf of a particular content provider.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Content delivered by a CDN may include so-called web pages (e.g., web pages in a markup language such as HTML pages or the like). A resource delivered by a CDN (e.g., a web page or the like) may include text and embedded objects (e.g., images, style sheets such as CSS, executable code such as JavaScript, etc.). A typical resource includes text portions and multiple embedded objects, and thus the process of rendering the resource (e.g., rendering the web page on a browser) requires rendering of each of the embedded objects. Each embedded object may be specified by a URI (typically a URL), and so the rendering of a web page and its embedded objects typically requires resolution of multiple hostname (in the embedded object URLs) and requesting and being served multiple objects. As used herein, the term "rendering" with respect to a particular resource refers to the process or act(s) of presenting or providing or executing the resource. Thus, e.g., a client may render an image by displaying the image on a display screen associated with the client; a client may render an audio resource by playing the audio associated with the resource on a speaker associated with the device; a client may render an executable resource such as a JavaScript resource by executing the code associated with the resource; and so on. When a client renders a compound resource, i.e., a resource comprising one or more other resources (e.g., a web page or the like), then the client renders the resource and its embedded resources. Typically client browsers can render markup language resources (e.g., HTML pages or the like) by rendering the resource and its embedded object(s).

It is generally desirable to reduce the number of requests a client (e.g., browser) must make of a host server and to reduce the size of content being served to a client. This is especially the case when the browser has a poor (e.g., low latency) or expensive Internet connection.

Various so-called front-end optimizations (FEOs) may be applied to content before it is delivered to a client (browser). These FEOs include file compression, code minimization or reduction, image optimization or compression, and reducing the number of HTTP requests (e.g., using so-called "sprite" images).

There are, however, some issues with FEOs. First, not all browsers support or can take advantage of all FEOs, and so not all content can make use of all FEOs. Second, not all content is pre-optimized (for FEOs), and there is a cost (on the server side) to perform FEOs, and a cost (on the client/browser side) to use resources that have been optimized. For example, if a resource is optimized by having its embedded objects compressed, then (i) there is a cost on the server-side of performing the compression, and (ii) there is a cost on the client side of decompression.

DESCRIPTION

Figure 2:
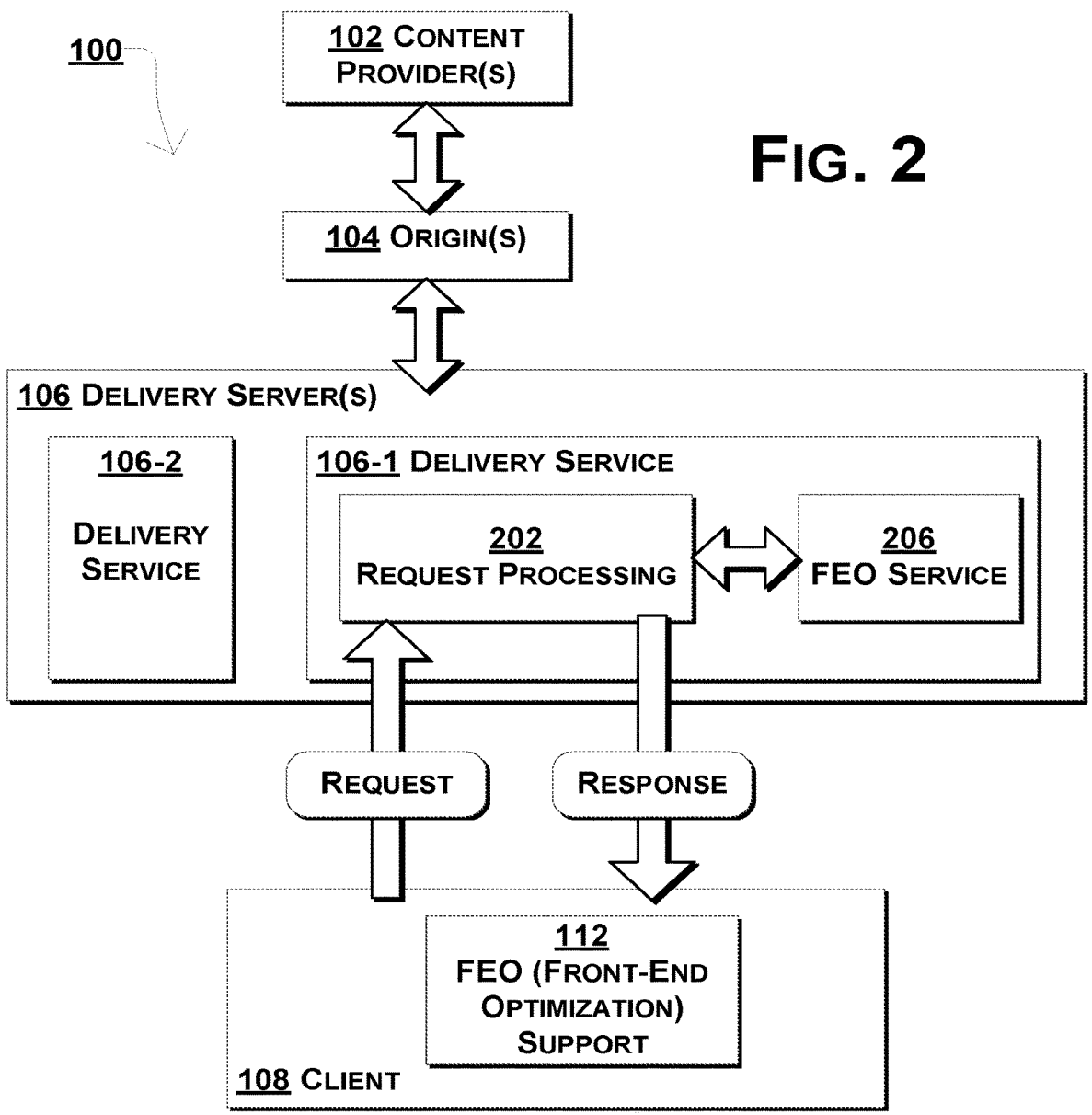
FIGS. 2-4 depicts a logical structure of content delivery services according to exemplary embodiments hereof.

With reference now to FIG. 2, client 108 (e.g., a browser) is provided with an optimization support mechanism 112 (e.g., as a browser plugin or the like). The optimization support mechanism 112 provides support for FEOs that may not be provided by the client itself. For example, the client may not support the decompression of compressed files, whereas the optimization support mechanism 112 may support such decompression. The optimization support mechanism 112 may be customized for different clients (e.g., for different browsers) so that if a client supports a particular optimization then that optimization need not be supported in the optimization support mechanism 112. In some cases, the optimization support mechanism 112 may duplicate functionality of the client 108.

When clients make requests (e.g., HTTP requests), they are generally able to provide information with the requests (e.g., the HTTP "User-Agent" string) that informs servers of the client's capabilities and limitations. However, the default "User-Agent" string for a client with an optimization support mechanism 112 may not reflect the actual capabilities of the combined client and optimization support mechanism 112.

In some exemplary embodiments the optimization support mechanism 112 may modify the client's settings to cause all CDN requests to be made via a proxy address. In this manner, since requests are made to a proxy, the CDN can determine that the client has an optimization support mechanism 112. The optimization support mechanism 112 may also (or instead) modify the "User-Agent" string so that servers provide optimized content supported by the combined client 108 and optimization support mechanism 112. The optimization support mechanism 112 may also (or instead) provide another header string or the like to inform the server of the capabilities of the combined client with and optimization support mechanism 112.

Request-Response Processing

With further reference to FIG. 2, when client 108 requests content from the CDN 100, the client request is directed to a particular delivery service 106-1 of the CD delivery servers 106. The client request may be directed to the particular delivery service 106-1 by a CDN rendezvous service (not shown).

Because the requesting client 108 includes optimization support mechanism 112, the request processing mechanism 202 on the delivery service 106-1 determines that the client can be served an optimized resource (i.e., a resource with various front-end optimizations) that can be processed by the client in combination with the optimization support mechanism 112. The delivery service 106-1 may use the client's information (e.g., the client's "User-Agent" string and/or other information) to ascertain the degree of optimization the client can support and whether the client includes an optimization support mechanism 112 and thus, what level of optimized content can be provided to the client. The HTTP "User-Agent" header field is described, e.g., in *Request for Comments:* 1945, "Hypertext Transfer Protocol—HTTP/1.0," Berners-Lee et al, Network Working Group, Section 10.15, May, 1996.

If the delivery service 106-1 does not have a copy of the requested resource it may request the resource from a peer delivery server or from an origin server 104. Since other servers (including the origin server or content provider) may already have an appropriately optimized version of the resource (i.e., a version of the resource optimized for a client with an optimization support mechanism 112), the delivery service 106-1 preferably requests an already-optimized version of the resource from a peer and/or the origin server and/or content provider. If no appropriately optimized version of the resource is found or available, the delivery service 106-1 may perform some or all front end optimizations, using an FEO service 206. As used herein, the term "appropriately optimized version of the resource" for a client with an optimization support mechanism means a version of the resource that has been optimized for the combined capabilities of the client and the optimization support mechanism on that client.

Figure 3:
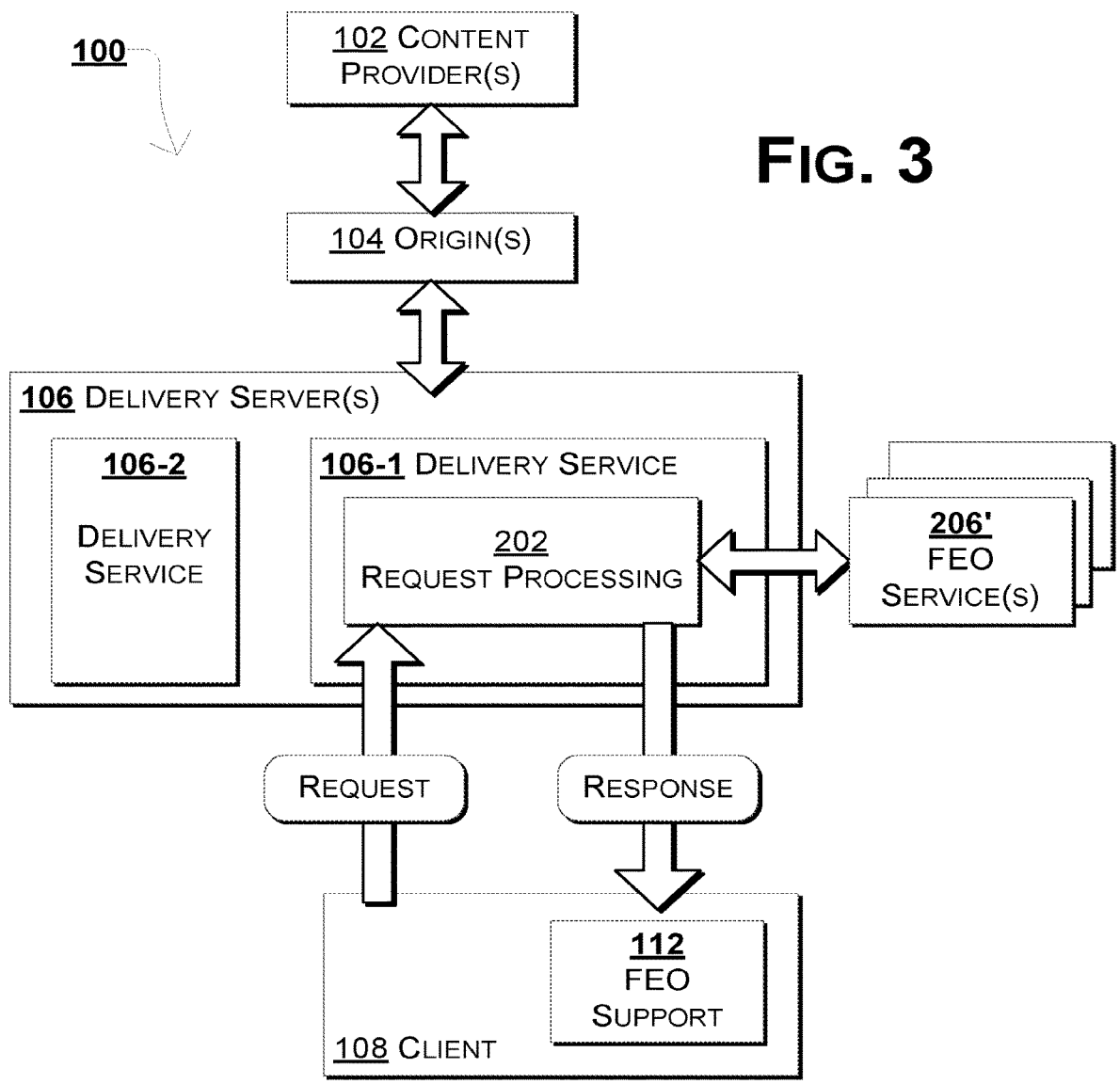

The FEO service 206 may be on or included in the delivery service 106 (as shown in FIG. 2) or it may be one or more separate services 206' as shown in FIG. 3. Those of ordinary skill in the art will realize and appreciate, upon reading this description, that the FEO service may be partially on the delivery service 106-1 and partially an external service. The one or more separate services 206' as shown in FIG. 3 may form an FEO services network in the CDN.

Since there is a cost (e.g., in terms of time and resource usage) associated with performing the front-end optimizations, in some exemplary embodiments hereof the request-processing 202 may determine that some or none of the available optimizations are to be performed (even if those optimizations are supported by the client and/or an associated optimization support mechanism). For example, some optimizations may be curtailed if the request-processing 202 can determine that the client's connection to the delivery service is via a fast or cheap connection, so that the benefit to the client will not be worth the delay caused by performing the optimizations. On the other hand, if the request-processing 202 can determine that the client's connection to the delivery service is via a slow and/or expensive connection (e.g., over a high-latency, low-bandwidth link via satellite from a nature reserve in Kenya to a server in California), then the request-processing 202 may have the FEO service(s) 206 perform as much optimization as possible that can be supported by the combined client and optimization support mechanism 112.

Figure 4:
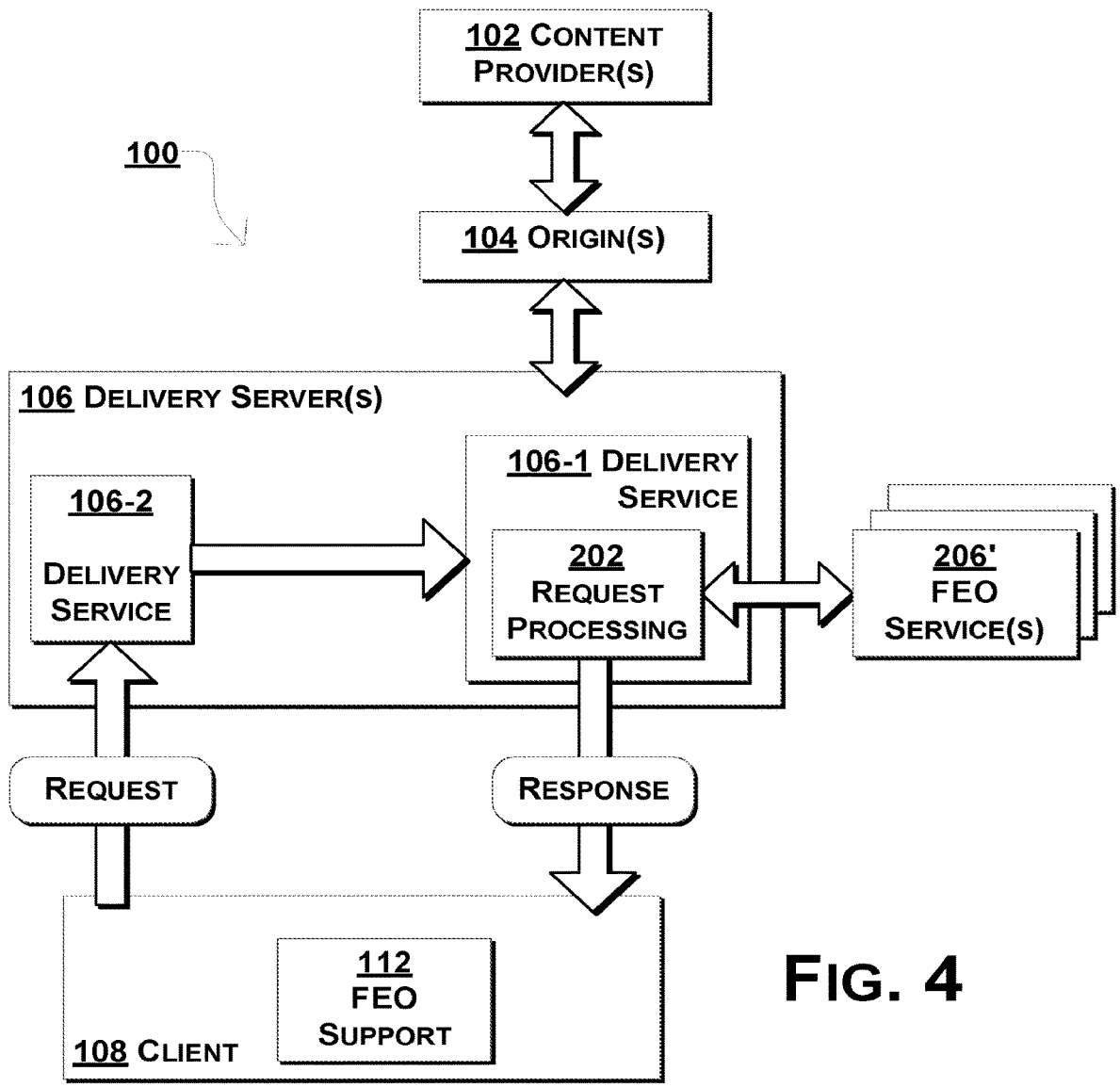

In some exemplary embodiments hereof, as shown, e.g., in FIG. 4, if the client request is received at a delivery service 106-2 that does not or cannot or will not handle the front-end optimizations, that delivery service 106-2 may hand off the request to another delivery service 106-1 that can handle the request (as described above). Preferably the other delivery service 106-1 serves the optimized resource directly to the requesting client 108.

A delivery service 106 preferably caches optimized resources in the same manner as non-optimized resources. In this way, the front-end optimizations may not have to be repeated for subsequent requests for the same resource. Optimized versions of a resource should be invalidated when the non-optimized version of the resource or of any embedded resource are invalidated or expire.

Computing

The services, mechanisms, operations and acts shown and described above are implemented, at least in part, by software running on one or more computers of CDN 100.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
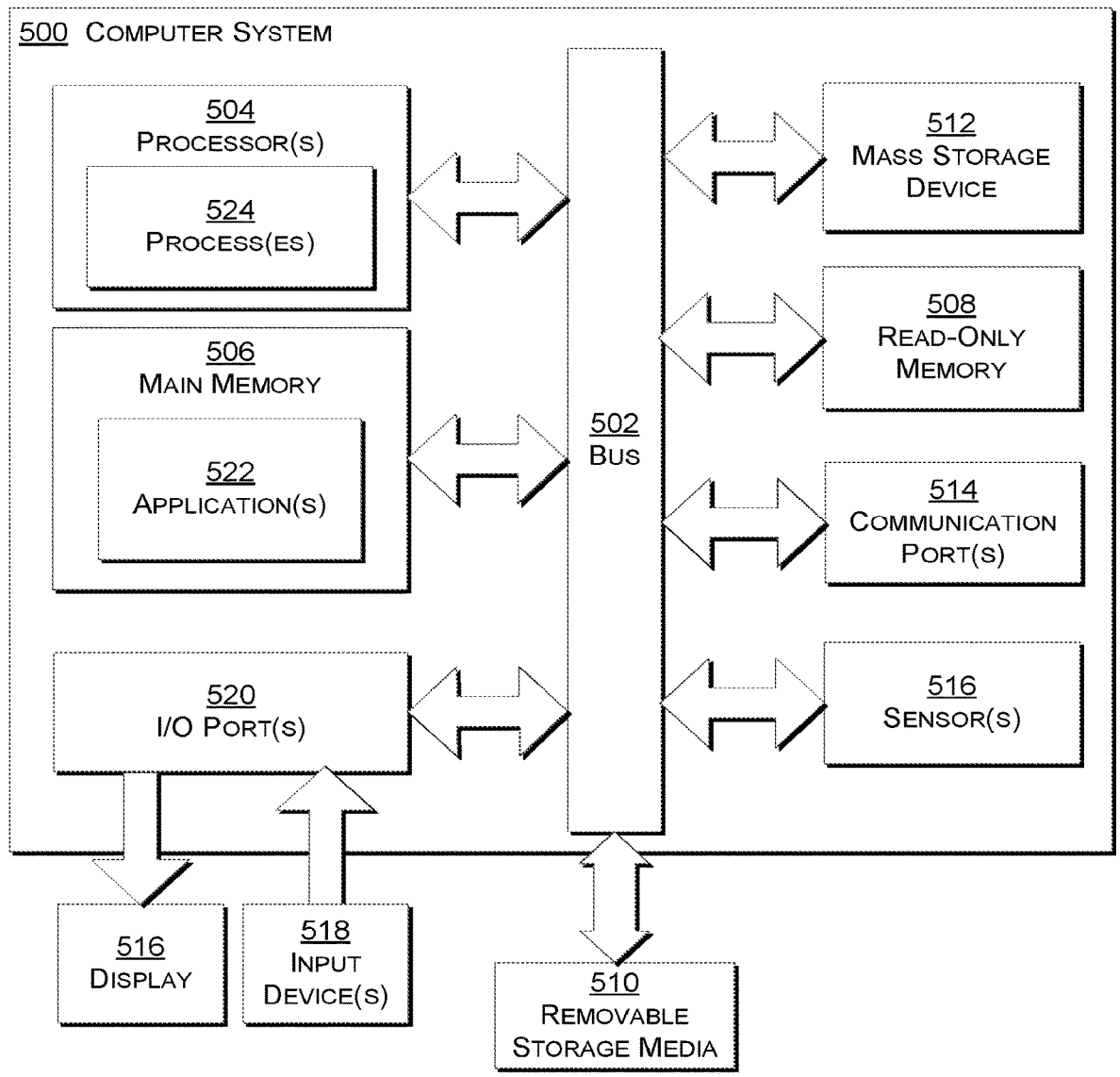
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 includes a bus 502 (i.e., interconnect), one or more processors 504, a main memory 506, read-only memory 508, removable storage media 510, mass storage 512, and one or more communications ports 514. Communication port 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be any known processor, such as, but not limited to, an Intel® Itanium® or Itanium 2® processor(s), AMD® Opteron® or Athlon MP® processor(s), or Motorola® lines of processors, and the like. Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520.

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMS, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that supports the functionality discussed herein (the application 522 may be an application that provides some or all of the functionality of the CD services described herein, including the client application and the optimization support mechanism 112). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508 and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed:

1. A computer-implemented method, operable on a device in a content delivery network (CDN), wherein the CDN delivers content on behalf of at least one content provider, the device implementing a content delivery (CD) service, the method comprising, by the CD service on the device:

receiving a request for a particular resource from a client operatively connected to the CDN via a connection;

determining that the client includes an optimization support mechanism using a modified user-agent string included in the request, wherein the optimization support mechanism comprises a decompression mechanism for decompressing a compressed resource;

determining a cost of the connection and a speed of the connection;

responsive to determining that the client includes the optimization support mechanism, determining to provide the client with a first version of the particular resource, the first version of the particular resource being optimized, at least in part, for the client in combination with the optimization support mechanism, wherein determining to provide the client with the first version of the particular resource is based on (i) the cost of the connection and the speed of the connection and (ii) a delay caused by optimization of the first version; and based on determining to provide the client with the first version of the particular resource, providing the client with the first version of the particular resource or providing the client with either (i) an un-optimized version of the particular resource, or (ii) a version of the particular resource optimized, at least in part, for the client without the optimization support mechanism, wherein the request is an HTTP request and wherein the information provided with the request is included in one or more HTTP headers provided with the HTTP request, wherein the determining the cost of the connection and the speed of the connection is based on a hostname associated with the request, and wherein the optimization includes code minimization or reduction.

2. The computer-implemented method of claim 1, wherein the client comprises a browser mechanism and wherein the optimization support mechanism is a plugin on the client.

3. The computer-implemented method of claim 1, wherein the client determines whether the client includes an optimization support mechanism based on information provided with the request.

4. The computer-implemented method of claim 1, wherein the optimization support mechanism causes the request to be made via a proxy.

5. The computer-implemented method of claim 1, further comprising attempting to obtain the first version of the particular resource from another location.

6. The computer-implemented method of claim 5, wherein the other location further comprises an origin CD service.

7. The computer-implemented method of claim 1, further comprising generating at least some of the first version of the particular resource.

8. The computer-implemented method of claim 7, wherein the generating comprises: causing at least some optimizations to be performed on the particular resource to produce the first version of the particular resource.

9. The computer-implemented method of claim 8, wherein the at least some optimizations are performed by one or more optimization services.

10. The computer-implemented method of claim 9, wherein the at least some optimizations are performed by one or more optimization services running on the device.

11. The computer-implemented method of claim 9, wherein the one or more optimization services comprise an optimization services network.

12. The computer-implemented method of claim 1, wherein the optimizations include one or more of: (i) file compression, (ii) code minimization or reduction, (iii) image optimization or compression, and (iv) manipulation of the caching policy as provided to the client.

13. A non-transitory computer-readable medium having program instructions stored thereon, the program instructions, operable on a computer system in a content delivery network (CDN), the computer system implementing a content delivery (CD) service, wherein execution of the program instructions by one or more processors of the computer system causes the one or more processors to carry out the acts of:

receive a request for a particular resource from a client operatively connected to the CDN via a connection;

determine that the client includes an optimization support mechanism using a modified user-agent string included in the request, wherein the optimization support mechanism comprises a decompression mechanism for decompressing a compressed resource;

determine a cost of the connection and a speed of the connection;

responsive to a determination that the client includes the optimization support mechanism, determine to provide the client with a first version of the particular resource, the first version of the particular resource being optimized, at least in part, for the client in combination with the optimization support mechanism, wherein determining to provide the client with the first version of the particular resource is determined based on (i) the cost of the connection and the speed of the connection and (ii) a delay caused by optimization of the first version; and based on determining to provide the client with the first version of the particular resource, provide the client with the first version of the particular resource or providing the client with either (i) an un-optimized version of the particular resource, or (ii) a version of the particular resource optimized, at least in part, for the client without the optimization support mechanism, wherein the request is an HTTP request and wherein the information provided with the request is included in one or more HTTP headers provided with the HTTP request, wherein the determining the cost of the connection and the speed of the connection is based on a hostname associated with the request, and wherein the optimization includes code minimization or reduction.

14. A tangible device in a content delivery network (CDN), wherein the CDN delivers content on behalf of at least one content provider, the tangible device implementing a content delivery (CD) service, the tangible device comprising:

at least one processor;

memory, operatively connected to the at least one processor, and containing instructions that, when executed by the at least one processor, cause the tangible device to:

receive a request for a particular resource from a client operatively connected to the CDN via a connection;

determine that the client includes an optimization support mechanism using a modified user-agent string included in the request, wherein the optimization support mechanism comprises a decompression mechanism for decompressing a compressed resource;

determine a cost of the connection and a speed of the connection;

responsive to a determination that the client includes the optimization support mechanism, determine to provide the client with a first version of the particular resource, the first version of the particular resource being optimized, at least in part, for the client in combination with the optimization support mechanism, wherein determining to provide the client with the first version of the particular resource is determined based on (i) the cost of the connection and the speed of the connection and (ii) a delay caused by optimization of the first version; and based on determining to provide the client with the first version of the particular resource, provide the client with the first version of the particular resource or providing the client with either (i) an un-optimized version of the particular resource, or (ii) a version of the particular resource optimized, at least in part, for the client without the optimization support mechanism, wherein the request is an HTTP request and wherein the information provided with the request is included in one or more HTTP headers provided with the HTTP request, wherein the determining the cost of the connection and the speed of the connection is based on a hostname associated with the request, and wherein the optimization includes code minimization or reduction.

15. The tangible device in a CDN of claim 14, wherein the client comprises a browser mechanism and wherein the optimization support mechanism is a plugin on the client.

16. The tangible device in a CDN of claim 14, wherein the client determines whether the client includes an optimization support mechanism based on information provided with the request.

\* \* \* \* \*